US 9,235,008 B2

(12) United States Patent
Park et al.

(10) Patent No.: US 9,235,008 B2
(45) Date of Patent: Jan. 12, 2016

(54) OPTICAL CONNECTOR AND OPTICAL MODULE HAVING THE SAME

(71) Applicant: SAMSUNG ELECTRO-MECHANICS CO., LTD., Suwon (KR)

(72) Inventors: Seung Wook Park, Suwon-si (KR); Christian Romero, Suwon-si (KR); Young Do Kweon, Suwon-si (KR); Chang Bae Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 378 days.

(21) Appl. No.: 13/708,860

(22) Filed: Dec. 7, 2012

(65) Prior Publication Data

US 2014/0003770 A1 Jan. 2, 2014

(30) Foreign Application Priority Data

Jun. 27, 2012 (KR) ........................ 10-2012-0069092

(51) Int. Cl.
*G02B 6/38* (2006.01)
*G02B 6/36* (2006.01)
*G02B 6/42* (2006.01)

(52) U.S. Cl.
CPC ............... *G02B 6/38* (2013.01); *G02B 6/3608* (2013.01); *G02B 6/4214* (2013.01)

(58) Field of Classification Search
CPC .................................................. G02B 6/4214
See application file for complete search history.

(56) References Cited

U.S. PATENT DOCUMENTS

| 6,414,785 B1* | 7/2002 | Berto et al. ................. 359/333 |
| 2006/0104592 A1* | 5/2006 | Jenkins et al. ............... 385/140 |
| 2006/0110104 A1* | 5/2006 | Sakai ........................ 385/33 |
| 2009/0304389 A1* | 12/2009 | Joe et al. ..................... 398/115 |
| 2012/0069579 A1* | 3/2012 | Koh et al. .................... 362/307 |

FOREIGN PATENT DOCUMENTS

| JP | 2006-023777 | 1/2006 |
| JP | 2006-053360 | 2/2006 |
| JP | 2007-334166 | 12/2007 |

OTHER PUBLICATIONS

Office action dated Jul. 26, 2013 from corresponding Korean Patent Application No. 10-2012-0069092 and its English summary provided by the clients.

* cited by examiner

*Primary Examiner* — Uyen Chau N Le
*Assistant Examiner* — Chad Smith
(74) *Attorney, Agent, or Firm* — NSIP Law

(57) ABSTRACT

Disclosed herein is an optical module including: an optical element mounted on a substrate; and an optical connector mounted corresponding to the optical element so as to change a path of an optical signal of the optical element and transfer the optical signal having the changed path. The optical module may provide various communication performances using an optical connector in which first and second connector parts are optically coupled stably to each other. Particularly, the optical module does not have a silicon optical bench (SiOB) as a medium, thereby making it possible to reduce a thickness of a product.

10 Claims, 3 Drawing Sheets

OPTICAL CONNECTOR AND OPTICAL MODULE HAVING THE SAME

CROSS REFERENCE TO RELATED APPLICATION

This application claims the benefit of Korean Patent Application No. 10-2012-0069092, filed on Jun. 27, 2012, entitled "Optical Connector and Optical Module Having the Same", which is hereby incorporated by reference in its entirety into this application.

BACKGROUND OF THE INVENTION

1. Technical Field

The present invention relates to an optical connector and an optical module having the same.

2. Description of the Related Art

Recently, an information communication environment has been developed into one wide band network in accordance with the integration of wired and wireless technologies and convergence of communication, broadcasting, and the Internet. Therefore, recently, an attempt to provide a high speed multimedia service even to a subscriber subscribing to the wide band network has accelerated. In the case of transmitting data through an existing copper line, there is a disadvantage that transmission loss is generated. Therefore, research into and development of a technology of replacing a copper line with an optical fiber has been conducted.

However, in optical communication using an optical module, the major disadvantage is that the optical module is expensive. The reason why the optical module is expensive is that an optical coupling process between an optical element and an optical fiber required for the optical module is not easy and it takes a large cost to perform optical coupling therebetween.

More specifically, in the case of the optical module according to the prior art, in order to provide stable optical coupling between the optical element and the optical fiber, a U groove or V groove is formed on a silicon optical bench (SiOB), the optical fiber is coupled thereto, and the optical element is mounted on the silicon optical bench using a flip chip bonding technology, thereby positioning the optical element and the optical fiber in a precision range required for the optical coupling between the optical element and the optical fiber.

This method may secure stable optical coupling, but requires a manufacturing process of forming the U groove or V groove on the silicon optical bench and again forming a pattern supplying an electrical signal to the optical element.

Further, in order to manufacture the optical module according to the prior art, an expensive flip chip bonding device should be used, and it takes a significant cost to manufacture the silicon optical bench, such that a cost of the optical module increases.

SUMMARY OF THE INVENTION

The present invention has been made in an effort to provide an optical module capable of allowing an optical element and an optical fiber to be optically coupled stably to each other without using a silicon optical bench.

Further, the present invention has been made in an effort to provide an optical connector for an optical module capable of allowing an optical element and an optical fiber to be optically coupled stably to each other without using a silicon optical bench.

According to a preferred embodiment of the present invention, there is provided an optical connector including: a first optical connector part including a reflecting member disposed at one side of a front end part and having a predetermined inclined angle to change a path of an optical signal of an optical element and a first through-hole through which the optical signal passes; and a second connector part including an insertion part into which the other side of the first optical connector part is inserted and a second through-hole provided with an optical fiber to which the optical signal passing through the first through-hole is incident.

The reflecting member may be a plate shaped member made of a metal material, and the inclined angle may be set to an angle for allowing the optical signal to be incident to the optical fiber.

The reflecting member may be a coated reflecting film, and the inclined angle may be set to an angle for allowing the optical signal to be incident to the optical fiber.

The reflecting film may include at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$).

An inner surface of the first through-hole may be provided with a coated reflecting film, wherein the coated reflecting film includes at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$).

The second connector part may further include a plurality of support members supporting the optical fiber provided in the second through-hole.

The support members may have a polygonal ring shape according to a cross section shape of the optical fiber and support the optical fiber at a predetermined interval along the second through-hole.

According to another preferred embodiment of the present invention, there is provided an optical module including: an optical element mounted on a substrate; and an optical connector mounted corresponding to the optical element so as to change a path of an optical signal of the optical element and transfer the optical signal having the changed path.

The optical connector may include: a first optical connector part including a reflecting member disposed at one side of a front end part and having a predetermined inclined angle to change the path of the optical signal of the optical element and a first through-hole through which the optical signal having the changed path passes; and a second connector part including an insertion part into which the other side of the first optical connector part is inserted and a second through-hole provided with an optical fiber to which the optical signal passing through the first through-hole is incident.

The optical element may include a vertical cavity surface emitting laser (VCSEL) generating and irradiating the optical signal in a direction vertical to a surface of the substrate.

The reflecting member may be a plate shaped member made of a metal material, and the inclined angle may be set to an angle for allowing the optical signal to be incident to the optical fiber.

The reflecting member may be a reflecting film including at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$), and the inclined angle may be set to an angle for allowing the optical signal to be incident to the optical fiber.

An inner surface of the first through-hole may be provided with a coated reflecting film, wherein the coated reflecting film includes at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$).

The second connector part may further include a plurality of support members supporting the optical fiber provided in the second through-hole.

The support members may have a polygonal ring shape according to a cross section shape of the optical fiber and support the optical fiber at a predetermined interval along the second through-hole.

According to still another preferred embodiment of the present invention, there is provided an optical module including: a substrate including a groove having an inclined surface; an optical element mounted corresponding to the groove of the substrate; and an optical connector mounted at one side of the substrate and provided with an optical fiber.

The substrate may sequentially include a base substrate, an optical waveguide, and an optical blocking film in an upward direction, and the included surface may be formed in the optical waveguide and the optical blocking film so as to have an inclined angle in a direction opposite to the optical connector.

The substrate may sequentially include a base substrate, an optical waveguide, and an optical blocking film in an upward direction, and the included surface may be formed in the optical waveguide and the optical blocking film so as to have an inclined angle in a direction toward the optical connector.

The optical element may include a VCSEL.

The inclined surface may be formed to have an inclined angle allowing an optical signal of the optical element to be reflected to another region of the substrate or the optical fiber of the optical connector.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
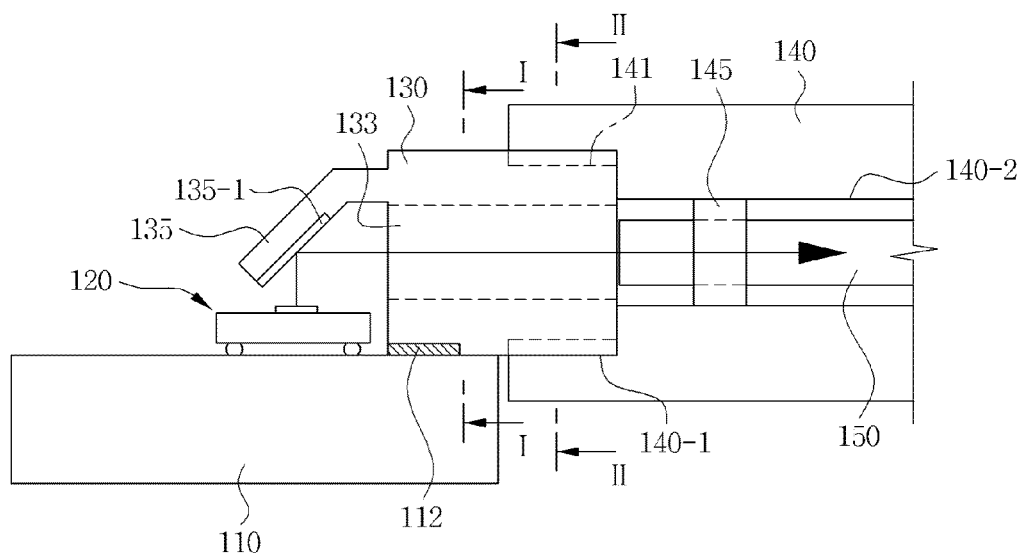
FIG. 1 is a cross-sectional view showing a side cross section of an optical module according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2A:
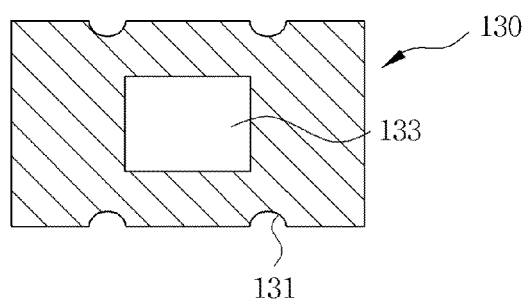
FIG. 2A is a cross-sectional view of a first optical connector part configuring an optical connection according to the first preferred embodiment of the present invention taken along the line I-I.
Figure 2B:
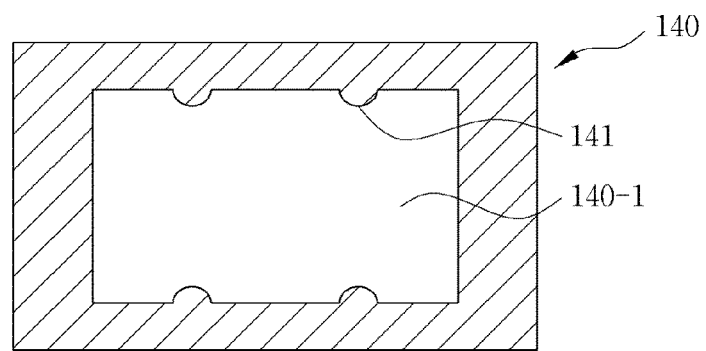
FIG. 2B is a cross-sectional view of a second optical connector part configuring an optical connection according to the first preferred embodiment of the present invention taken along the line II-II.

FIG. 1 is a cross-sectional view showing a side cross section of an optical module according to a first preferred embodiment of the present invention; FIG. 2A is a cross-sectional view of a first optical connector part configuring an optical connection according to the first preferred embodiment of the present invention taken along the line I-I; and FIG. 2B is a cross-sectional view of a second optical connector part configuring an optical connection according to the first preferred embodiment of the present invention taken along the line II-II.

As shown in FIG. 1, the optical module according to the first preferred embodiment of the present invention has a structure in which an optical element 120 is directly mounted on a substrate 110 without a silicon optical bench (SiOB) and an optical connector configured of first and second optical connector parts 130 and 140 is mounted corresponding to the optical element 120.

The optical element 120, which is an element converting an electrical signal into an optical signal, may be, for example, a vertical cavity surface emitting laser (VCSEL) generating and irradiating the optical signal in a direction vertical to a surface of the substrate 110.

Therefore, in the optical module according to the first preferred embodiment of the present invention, since the VCSEL 120 is directly mounted on the substrate 110 without the silicon optical bench (SiOB), the optical module may be slimmed. Further, in the optical module according to the first preferred embodiment of the present invention, since the silicon optical bench (SiOB) is not manufactured and mounted, manufacturing and mounting costs of the optical module may be reduced.

The first optical connector part 130 includes a front end part 135 having a reflecting plate 135-1 disposed over the VCSEL 120, corresponding to the VCSEL 120, and is provided with a first through-hole 133 through which the optical signal of the VCSEL 120 having a path changed by the reflecting plate 135-1 passes, as shown in FIG. 2A.

More specifically, a lower surface of the front end part 135 is provided with the reflecting plate 135-1 corresponding to the VCSEL 120 and having a predetermined inclined angle, wherein the reflecting plate 135-1 changes the path of the laser optical signal of the VCSEL 120 that is vertically irradiated toward the first through-hole 133. The reflecting plate 135-1 may be a rectangular plate shaped member made of a metal material having high reflecting efficiency, such as gold, platinum, silver, nickel, aluminum, or the like.

The reflecting plate 135-1 is not the plate shaped member, but may also be a coated reflecting film formed on the lower surface of the front end part 135 and including a synthetic resin and a reflecting material. That is, the reflecting plate 135-1 may also be a coated reflecting film including a synthetic resin such as polyethylene terephthalate (PET), polyethylene naphthalate, polymethylmethacrylate (PMMA), polycarbonate, polystyrene, polyolefin, celluloseacetate, polyvinyl chloride, or the like, and a reflecting material such as titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$), or the like.

The first through-hole 133, which is a passage inducing the optical signal of the VCSEL 120 having the changed pass to an optical fiber 150 of the second optical connector part 140, may be formed as a passage that may have various polygonal cross sections, in addition to a rectangular cross section shown in FIG. 2A.

Further, an inner surface of the first through-hole 133 may be coated with a reflecting film including a synthetic resin such as polyethylene terephthalate (PET), polyethylene naphthalate, polymethylmethacrylate (PMMA), polycarbonate, polystyrene, polyolefin, celluloseacetate, polyvinyl chloride, or the like, and a reflecting material such as titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$), or the like, similar to the reflecting film, which is another form of the reflecting plate 135-1. Therefore, the optical signal of the VCSEL 120 may be induced to the optical fiber 150 without loss.

The first optical connector part 130 as described above may include an electrical connection terminal 112 disposed at one side of a lower portion thereof and electrically connected to a pad provided on an upper surface of the substrate 110 to transfer signals regarding power and speed controls for the VCSEL 120.

In the first optical connector part 130 configured as described above, the other end of the front end part 135 is inserted into an insertion part 140-1 of the second optical connector part 140 shown in FIG. 2B. In this case, a plurality of fastening groove lines 131 formed at an outer surface of the first optical connector part 130 are engaged with fastening protrusion lines 141 formed in the insertion part 140-1 of the second optical connector part 140, respectively.

The second optical connector part 140 having the insertion part 140-1 in which the first optical connector part 130 is insertedly mounted as described above has a second through-hole 1402-2 extended while having a step with respect to the insertion part 140-1.

The second through-hole 140-2 of the second optical connector part 140 as described above is provided with the optical fiber 150 supported by at least one support member 145, as shown in FIG. 1. Here, the support member 145 may have a polygonal ring shape such as a circular ring shape, a rectangular ring shape, or the like, according to a cross section shape of the optical fiber 150 and support the optical fiber 150 at a predetermined interval along the second through-hole 140-2.

In this case, one surface of the optical fiber 150 mounted at the insertion part 140-1 side may have the same form and size as those of a cross section of the first through-hole 133 and be engaged with the first through-hole 133. That is, the optical fiber 150 having the same form and size as those of the cross section of the first through-hole 133 may be engaged with the first through-hole 133 and be extended along the second through-hole 140-2 of the second optical connector part 140.

The optical fiber 150 does not have the same form and size as those of the cross section of the first through-hole 133, but may also contact the first through-hole 133 in a form in which it is larger than the cross section of the first through-hole 133 and be extended along the second through-hole 140-2.

Therefore, the optical connector configured of the first and second optical connector parts 130 and 140 accomplishes stable optical coupling, such that the optical signal of the VCSEL 120 transferred through the first through-hole 133 may be easily transferred to the optical fiber 150 without the optical loss.

The optical connector in which the first and second optical connector parts 130 and 140 are optically coupled stably to each other may easily change the path of the optical signal of the VCSEL 120 toward the optical fiber 150 using the reflective plate 135-1 or the reflecting film provided at the first optical connector part 130 and having a predetermined inclined angle.

In addition, the first and second connector parts 130 and 140 are attached to or detached from each other according to various communication qualities, such that the second connector part 140 including the optical fiber 150 appropriate for the communication quality may be selected and mounted.

In addition, the optical module according to the first preferred embodiment of the present invention may provide various communication performances using the optical connector having the above-mentioned features. Particularly, the optical module according to the first preferred embodiment of the present invention does not have the silicon optical bench (SiOB) as a medium, thereby making it possible to reduce a thickness of a product.

Figure 3:
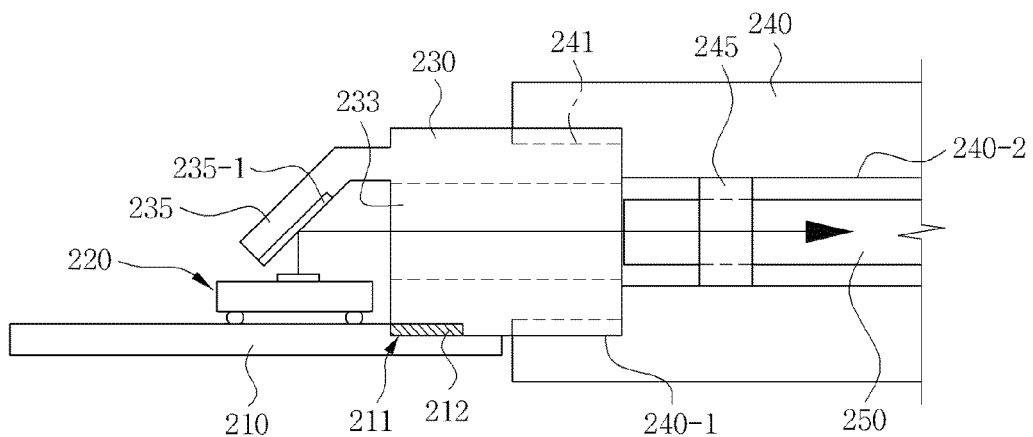
FIG. 3 is a cross-sectional view showing a side cross section of an optical module according to a second preferred embodiment of the present invention.

Hereinafter, an optical module according to a second preferred embodiment of the present invention will be described with reference to FIG. 3. FIG. 3 is a cross-sectional view showing a side cross section of an optical module according to a second preferred embodiment of the present invention. Here, in describing the optical module according to the second preferred embodiment of the present invention, components that are the same as or correspond to those of the optical module according to the first preferred embodiment of the present invention will be denoted by similar reference numerals, and a description of overlapped portions will be omitted.

As shown in FIG. 3, the optical module according to the second preferred embodiment of the present invention is similar to the optical module according to the first preferred embodiment of the present invention except that a region of a substrate 210 at which a first optical connector part 230 is mounted is provided with a step 211.

The above-mentioned step 211 region, which is a region including an electrical connection terminal 212 transferring signals regarding power and speed controls for a VCSEL 220 and engaged with the first optical connector part 230, reduces a height step of the first optical connector part 230 with respect to the substrate 210, thereby making it possible to allow stable optical coupling to be accomplished.

Therefore, the optical module according to the second preferred embodiment of the present invention may further reduce a thickness of a product while easily changing a path of an optical signal of the VCSEL 220 toward an optical fiber 250 using a reflecting plate 235-1 or a reflecting film having a predetermined inclined angle.

Figure 4:
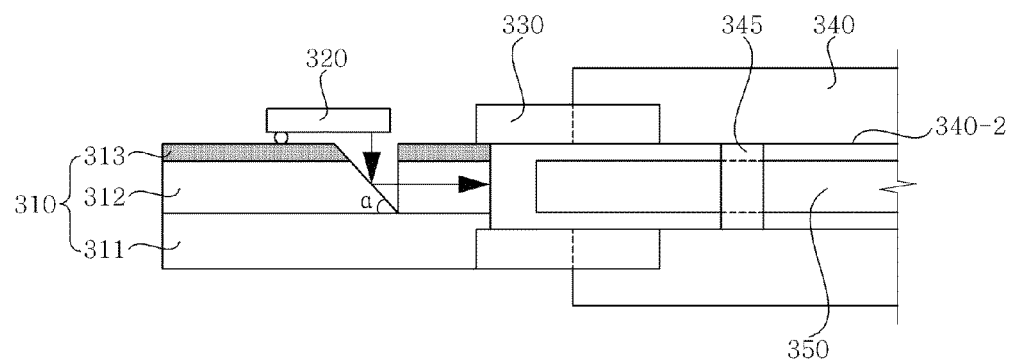
FIG. 4 is a cross-sectional view showing a side cross section of an optical module according to a third preferred embodiment of the present invention.

Hereinafter, an optical module according to a third preferred embodiment of the present invention will be described with reference to FIG. 4. FIG. 4 is a cross-sectional view showing a side cross section of an optical module according to a third preferred embodiment of the present invention. Here, in describing the optical module according to the third preferred embodiment of the present invention, components that are the same as or correspond to those of the optical module according to the first preferred embodiment of the present invention will be denoted by similar reference numerals, and a description of overlapped portions will be omitted.

The optical module according to the third preferred embodiment of the present invention has a structure in which an optical element 320 is directly mounted on a substrate 310 without a silicon optical bench (SiOB) and includes a groove formed in the substrate 310 in order to transfer an optical signal of the optical element 320 to an optical connector configured of first and second connector parts 330 and 340.

More specifically, the substrate 310 of the optical module according to the third preferred embodiment of the present invention may include a base substrate 311, an optical waveguide layer 312, and an optical blocking film 313, wherein the optical waveguide layer 312 and the optical blocking film 313 may have a groove formed at a position corresponding to that of the optical element 320 and having an inclined angle of "α".

The above-mentioned groove has an inclined surface having the inclined angle of "α" in a direction opposite to the optical connector configured of the first and second connector parts 330 and 340 and reflects light of the optical element 320, thereby making it possible to transfer the light to an optical fiber 350 provided in the first and second connector parts 330 and 340.

Therefore, the inclined angle α of the groove formed in the optical waveguide layer 312 and the optical blocking film 313 may be set in the range in which the light of the optical element 320 may be reflected to the optical fiber 350.

The optical element 320, which is an element generating and irradiating an optical signal to the inclined surface formed at the groove of the substrate 310 and having the inclined angle α, may be a vertical cavity surface emitting laser (VCSEL).

In the optical module according to the third preferred embodiment of the present invention configured as described above, the inclined surface of the groove reflecting the light of the optical element 320 to the optical fiber 350 is directly provided in the substrate 310 without the silicon optical bench (SiOB), thereby making it possible to slim the optical module and reduce manufacturing and mounting costs of the optical module.

Figure 5:
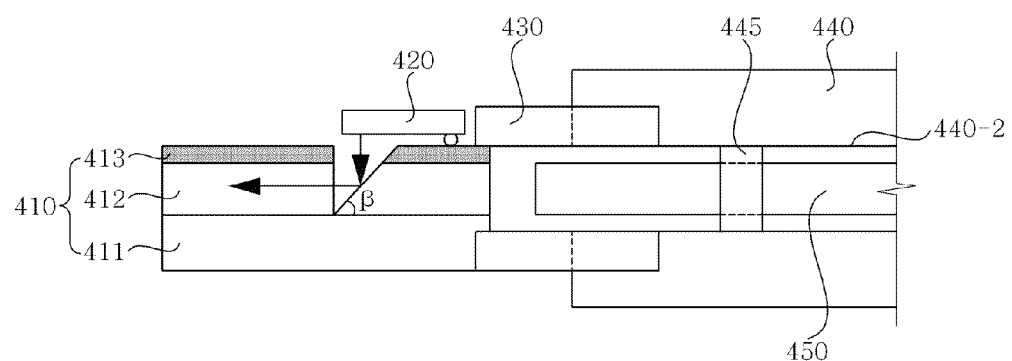
FIG. 5 is a cross-sectional view showing a side cross section of an optical module according to a fourth preferred embodiment of the present invention.

Hereinafter, an optical module according to a fourth preferred embodiment of the present invention will be described with reference to FIG. 5. FIG. 5 is a cross-sectional view showing a side cross section of an optical module according to a fourth preferred embodiment of the present invention. Here, in describing the optical module according to the fourth preferred embodiment of the present invention, components that are the same as or correspond to those of the optical module according to the first preferred embodiment of the present invention will be denoted by similar reference numerals, and a description of overlapped portions will be omitted.

The optical module according to the fourth preferred embodiment of the present invention has a structure in which an optical element 420 is directly mounted on a substrate 410 without a silicon optical bench (SiOB) and includes a groove formed in the substrate 410 in order to transfer an optical signal of the optical element 420 to another region of the substrate 410.

More specifically, the substrate 410 of the optical module according to the fourth preferred embodiment of the present invention may include a base substrate 411, an optical waveguide layer 412, and an optical blocking film 413, wherein the optical waveguide layer 412 and the optical blocking film 413 may have a groove formed at a position corresponding to that of the optical element 420 and having an inclined angle of "β".

The above-mentioned groove has an inclined surface having the inclined angle of "β" in a direction toward an optical connector configured of first and second connector parts 430 and 440 and reflects light of the optical element 420 to the optical waveguide layer 412 of the substrate 410, thereby making it possible to transfer the light to another region of the substrate 410.

In the optical module according to the fourth preferred embodiment of the present invention configured as described above, the inclined surface of the groove reflecting the light of the optical element 420 is directly provided in the substrate 410 without the silicon optical bench (SiOB) to transfer the light to another region of the substrate 410, thereby making it possible to slim the optical module and reduce manufacturing and mounting costs of the optical module.

With the optical connector according to the preferred embodiments of the present invention, the first and second connector parts are optically coupled stably to each other, thereby making it possible to easily change the path of the optical signal of the VCSEL toward the optical fiber using the reflective plate or the reflecting film provided at the first optical connector part and having a predetermined inclined angle.

The optical module according to the preferred embodiments of the present invention may provide various communication performances using the optical connector in which the first and second connector parts are optically coupled stably to each other. Particularly, the optical module according to the preferred embodiments of the present invention does not have the silicon optical bench (SiOB) as a medium, thereby making it possible to reduce a thickness of a product.

The optical module according to the preferred embodiments of the present invention includes the groove directly formed in the substrate and reflecting the light of the optical element, thereby making it possible to provide various communication performances. Particularly, the optical module according to the preferred embodiments of the present invention does not have the silicon optical bench (SiOB) as a medium, thereby making it possible to reduce a thickness of a product.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An optical connector comprising:
   a first optical connector part including a reflecting member disposed at one side of a front end part and having a predetermined inclined angle to change a path of an optical signal of an optical element and a first through-hole through which the optical signal passes; and
   a second connector part including an insertion part into which an other side of the first optical connector part is inserted and a second through-hole provided with an optical fiber to which the optical signal passing through the first through-hole is incident,
   wherein, the second connector part further includes a plurality of support members supporting the optical fiber provided in the second through-hole,
   wherein the support members have a polygonal ring shape according to a cross section shape of the optical fiber and support the optical fiber at a predetermined interval along the second through-hole.

2. The optical connector as set forth in claim 1, wherein the reflecting member is a plate shaped member made of a metal material, and
   the inclined angle is set to an angle for allowing the optical signal to be incident to the optical fiber.

3. The optical connector as set forth in claim 1, wherein the reflecting member is a coated reflecting film, and
   the inclined angle is set to an angle for allowing the optical signal to be incident to the optical fiber.

4. The optical connector as set forth in claim 3, wherein the reflecting film includes at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$).

5. The optical connector as set forth in claim 1, wherein an inner surface of the first through-hole is provided with a coated reflecting film, the coated reflecting film including at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$).

6. An optical module comprising:
   an optical element mounted on a substrate; and
   an optical connector mounted corresponding to the optical element so as to change a path of an optical signal of the optical element and transfer the optical signal having the changed path,
   wherein the optical connector comprises:
   a first optical connector part including a reflecting member disposed at one side of a front end art and having a predetermined inclined angle to change the path of the optical signal of the optical element and a first through-hole through which the optical signal having the changed path passes; and
   a second connector a including an insertion part into which an other side of the first optic connector is inserted and a second through-hole provided with an optical fiber to which the optical signal passing through the first through-hole is incident,
   wherein the second connector part further includes a plurality of support members supporting the optical fiber provided in the second through-hole,
   wherein the support members have a polygonal ring shape according to a cross section shape of the optical fiber and support the optical fiber at a predetermined interval along the second through-hole.

7. The optical module as set forth in claim 6, wherein the optical element includes a vertical cavity surface emitting laser (VCSEL) generating and irradiating the optical signal in a direction vertical to a surface of the substrate.

8. The optical module as set forth in claim 6, wherein the reflecting member is a plate shaped member made of a metal material, and
   the inclined angle is set to an angle for allowing the optical signal to be incident to the optical fiber.

9. The optical module as set forth in claim 6, wherein the reflecting member is a reflecting film including at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$), and
   the inclined angle is set to an angle for allowing the optical signal to be incident to the optical fiber.

10. The optical module as set forth in claim 6, wherein an inner surface of the first through-hole is provided with a coated reflecting film, the coated reflecting film including at least any one synthetic resin among polyethylene terephthalate (PET), polyethylene naphthalate, polymethylmethacrylate (PMMA), polycarbonate, polystyrene, polyolefin, celluloseacetate, and polyvinyl chloride and at least any one reflecting material among titanium dioxide ($TiO_2$), silicon dioxide ($SiO_2$), zinc oxide (ZnO), lead carbonate ($PbCO_3$), barium sulfate ($BaSO_4$), calcium carbonate ($CaCO_3$), and aluminum oxide ($Al_2O_3$).

* * * * *